United States Patent
Posner et al.

(10) Patent No.: US 8,867,015 B2
(45) Date of Patent: Oct. 21, 2014

(54) DISPLAYS WITH LIQUID CRYSTAL SHUTTERS

(75) Inventors: Bryan W. Posner, La Selva Beach, CA (US); Jun Qi, Cupertino, CA (US); Victor H. Yin, Cupertino, CA (US); Thomas W. Wilson, Jr., Saratoga, CA (US); Dinesh C. Mathew, Fremont, CA (US); Keith J. Hendren, Capitola, CA (US); Peteris K. Augenbergs, San Francisco, CA (US); Adam T. Garelli, Santa Clara, CA (US); Stephen R. McClure, San Francisco, CA (US); Carl R. Peterson, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 13/348,496

(22) Filed: Jan. 11, 2012

(65) Prior Publication Data

US 2013/0176512 A1 Jul. 11, 2013

(51) Int. Cl.
*G02F 1/1335* (2006.01)
*G02F 1/1333* (2006.01)
*G02F 1/13* (2006.01)

(52) U.S. Cl.
USPC .............. 349/193; 349/16; 349/110; 348/296

(58) Field of Classification Search
USPC .................... 349/16, 193, 195, 110; 348/296
See application file for complete search history.

(56) References Cited

U.S. PATENT DOCUMENTS

| | | | |
|---|---|---|---|
| 4,301,476 A | 11/1981 | Keller et al. | |
| 4,566,029 A | 1/1986 | Johnson | |
| 5,649,897 A * | 7/1997 | Nakamura et al. | 600/111 |
| 5,678,089 A | 10/1997 | Bacs, Jr. et al. | |
| 5,764,291 A | 6/1998 | Fullam | |
| 5,883,695 A | 3/1999 | Paul | |
| 5,944,655 A | 8/1999 | Becker | |
| 5,995,145 A * | 11/1999 | Viliesid | 348/362 |
| 6,094,215 A | 7/2000 | Sundahl et al. | |
| 6,128,049 A | 10/2000 | Butterworth | |
| 6,151,164 A | 11/2000 | Greening et al. | |
| 6,256,066 B1 | 7/2001 | Yukawa et al. | |
| 6,281,927 B1 | 8/2001 | Otto et al. | |

(Continued)

FOREIGN PATENT DOCUMENTS

| | | | |
|---|---|---|---|
| JP | 2000214517 | | 8/2000 |
| JP | 2001298654 | | 10/2001 |
| JP | 2002076378 A | * | 3/2002 |
| JP | 2004040201 | | 2/2004 |

*Primary Examiner* — Nathanael R Briggs
(74) *Attorney, Agent, or Firm* — Treyz Law Group; G. Victor Treyz; Kendall P. Woodruff

(57) ABSTRACT

An electronic device may have a display such as a liquid crystal display. The display may have an array of display pixels. The array of display pixels may display images for a user in an active area of the display. An inactive area of the display may surround the active area. An opaque masking layer may be provided in the inactive area to block internal components in the electronic device from view. An optical component such as a light-based proximity sensor, ambient light sensor, image sensor, or light-emitting status indicator may be aligned with an opening in the opaque masking layer. A liquid crystal shutter may be provided in the display. The liquid crystal shutter may be controlled by control circuitry in the electronic device. The liquid crystal shutter may be aligned with the opening in the opaque masking layer in the inactive area and with the optical component.

11 Claims, 9 Drawing Sheets

(56) References Cited

U.S. PATENT DOCUMENTS

| | | |
|---|---|---|
| 6,285,834 B1 | 9/2001 | Hylen |
| 6,481,851 B1 | 11/2002 | McNelley et al. |
| 6,545,670 B1 | 4/2003 | Pryor |
| 6,546,208 B1 | 4/2003 | Costales |
| 6,624,935 B2 | 9/2003 | Weissman et al. |
| 6,683,298 B1 | 1/2004 | Hunter et al. |
| 7,170,677 B1 | 1/2007 | Bendall et al. |
| 7,327,410 B2 | 2/2008 | Cho et al. |
| 7,513,701 B2 | 4/2009 | Naganuma |
| 7,728,906 B2 * | 6/2010 | Bilbrey .................. 348/373 |
| 8,253,852 B2 | 8/2012 | Bilbrey |
| 2001/0014006 A1 | 8/2001 | Kim et al. |
| 2002/0175886 A1 | 11/2002 | Hum |
| 2003/0052964 A1 | 3/2003 | Priestman et al. |
| 2003/0125008 A1 | 7/2003 | Shimamura |
| 2005/0174470 A1 | 8/2005 | Yamasaki |
| 2005/0259179 A1 | 11/2005 | Robertson et al. |
| 2005/0275751 A1 | 12/2005 | VanEpps, Jr. |
| 2007/0002130 A1 * | 1/2007 | Hartkop .................. 348/14.16 |
| 2007/0046680 A1 | 3/2007 | Hedrick et al. |
| 2008/0013001 A1 | 1/2008 | Jang et al. |
| 2009/0185115 A1 * | 7/2009 | Nishida et al. .......... 349/106 |
| 2011/0242089 A1 | 10/2011 | Miki et al. |
| 2012/0026436 A1 * | 2/2012 | Wang et al. ............. 349/106 |
| 2012/0218450 A1 * | 8/2012 | Pavithran et al. ........ 348/296 |
| 2013/0050549 A1 | 2/2013 | Bilbrey |
| 2013/0120673 A1 * | 5/2013 | Yasukawa ................ 349/5 |

* cited by examiner

DISPLAYS WITH LIQUID CRYSTAL SHUTTERS

BACKGROUND

This relates generally to electronic devices and, more particularly, to electronic devices with displays and optical components.

Electronic devices such as computers and cellular telephones may have displays. Computers and cellular telephones may also include optical components such as cameras. For example, a computer or cellular telephone may include a front-facing camera for use in videoconferencing sessions.

It can be challenging to accommodate optical components such as cameras in electronic devices with displays.

In some devices, a camera may be mounted under a circular hole in a plastic display bezel. The circular hole in the bezel in this type of arrangement is visible to the user and may detract from the appearance of the device.

To improve device aesthetics, a device may be provided with a display that has a black border with a hole to accommodate a camera. The black border may be formed from a layer of black masking material on the underside of a display cover glass. A device of this type need not include a plastic display bezel. Nevertheless, the presence of the hole in the black border region can be visually unappealing.

It would therefore be desirable to be able to provide improved ways in which to mount optical components such as cameras in electronic devices with displays.

SUMMARY

An electronic device may have a display. The display may have an array of display pixels. The array of display pixels may display images for a user in an active area of the display. The display may be a liquid crystal display that has a layer of liquid crystal material. The display pixels in the active area may be provided with electrodes that control electric fields that are applied to the liquid crystal material.

An inactive area of the display may surround the active area. An opaque masking layer may be provided in the inactive area to serve as a border that blocks internal components in the electronic device from view.

An optical component such as a light-based proximity sensor, ambient light sensor, camera, or light-emitting status indicator may be aligned with an opening in the opaque masking layer. A liquid crystal shutter may be provided in the display. The liquid crystal shutter may be controlled by control circuitry in the electronic device. The liquid crystal shutter may be aligned with the opening in the opaque masking layer in the inactive area and with the optical component. The control circuitry may open the liquid crystal shutter to allow light to pass through the opening to support operation of the optical component. The control circuitry may close the liquid crystal shutter when the optical component is not producing or receiving light. In its closed position, the liquid crystal shutter may have a dark appearance that matches the dark appearance of surrounding portions of the opaque masking layer and may block the optical components from vie through the opening in the opaque masking layer.

Further features of the invention, its nature and various advantages will be more apparent from the accompanying drawings and the following detailed description of the preferred embodiments.

DETAILED DESCRIPTION

Figure 1:
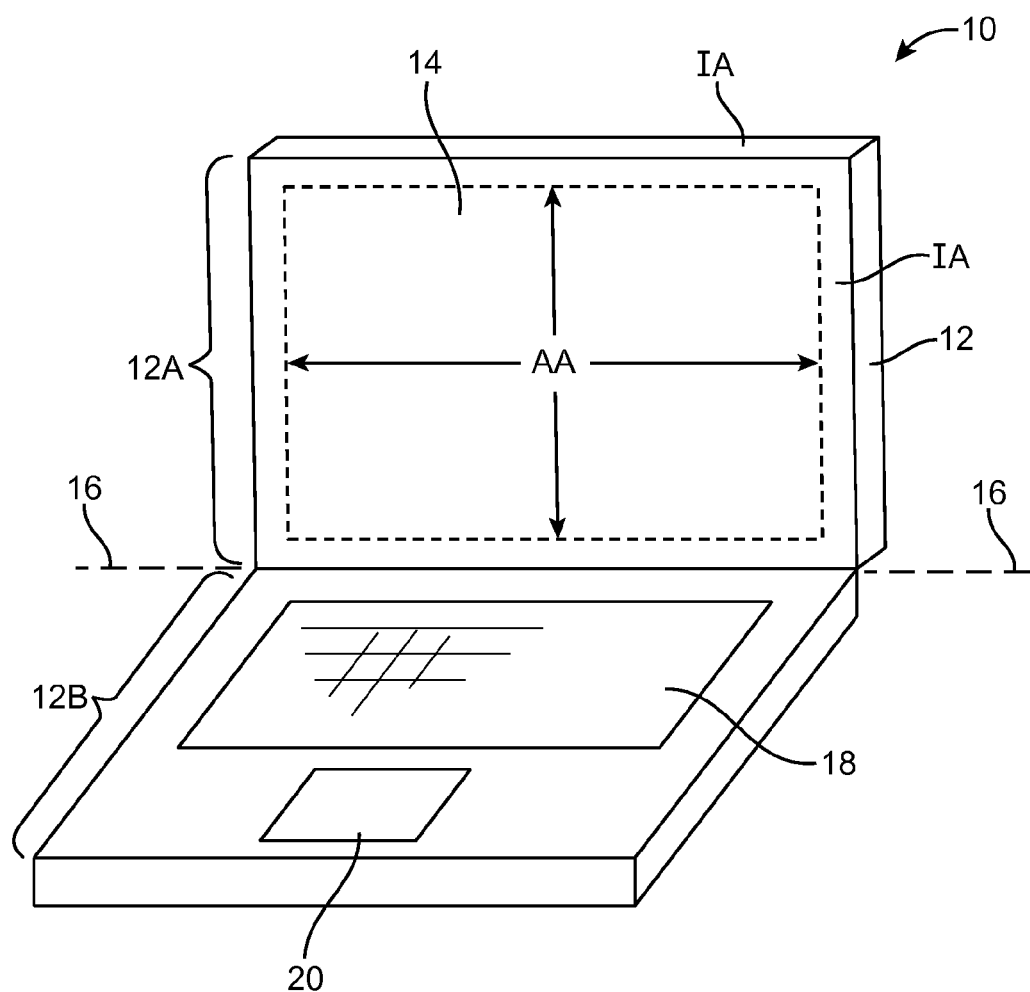
FIG. 1 is a diagram of an illustrative electronic device such as a portable computer with a display and one or more optical components in accordance with an embodiment of the present invention.

An illustrative electronic device of the type that may be provided with a display and one or more optical components is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 18 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Display 14 may have an active area such as active area AA and an inactive area such as area IA. Active area AA may be, for example, a rectangular region in the center of display 14 in which display pixels are actively used to display images for a user of device 10. Inactive area IA may be devoid of active display pixels, but may contain one or more liquid crystal shutters for selectively hiding and uncovering one or more optical components. In the example of FIG. 1, inactive area IA has the shape of a rectangular ring, surrounding the periphery of active area AA of display 14.

Circuitry and other components may sometimes be formed in inactive area IA. To hide the circuitry and other components from view by a user of device 10, inactive area IA may sometimes be provided with an opaque mask. The opaque mask can be formed from an opaque material such as a black pigmented polymer material or may be formed from opaque masking materials of other colors. Configurations in which the opaque masking material in display 14 has a black appearance are sometimes described herein as an example. This is, however, merely illustrative. Opaque masking layers in device 10 may have any suitable colors.

Figure 2:
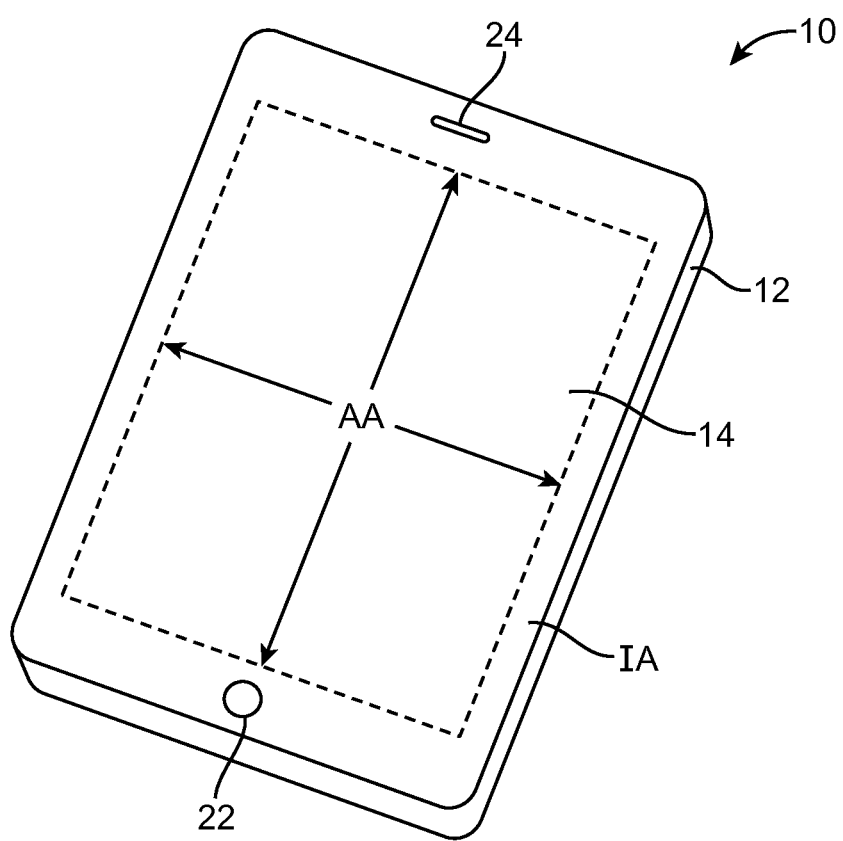
FIG. 2 is a diagram of an illustrative electronic device such as a cellular telephone or other handheld device with a display and one or more optical components in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an inactive portion such as inactive portion IA that surrounds an active portion such as active portion AA. Display 14 may have openings (e.g., openings in inactive region IA or active region AA of display 14) such as an opening to accommodate button 22 and an opening to accommodate speaker port 24.

Figure 3:
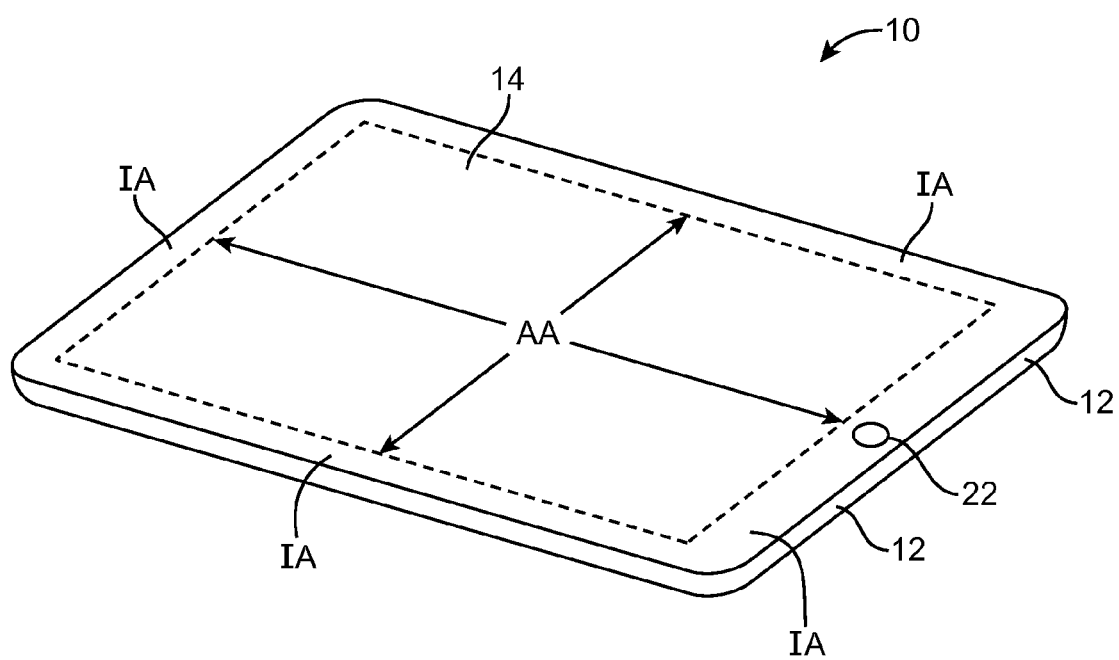
FIG. 3 is a diagram of an illustrative electronic device such as a tablet computer with a display and one or more optical components in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22 (e.g., in inactive region IA surrounding active region AA).

Figure 4:
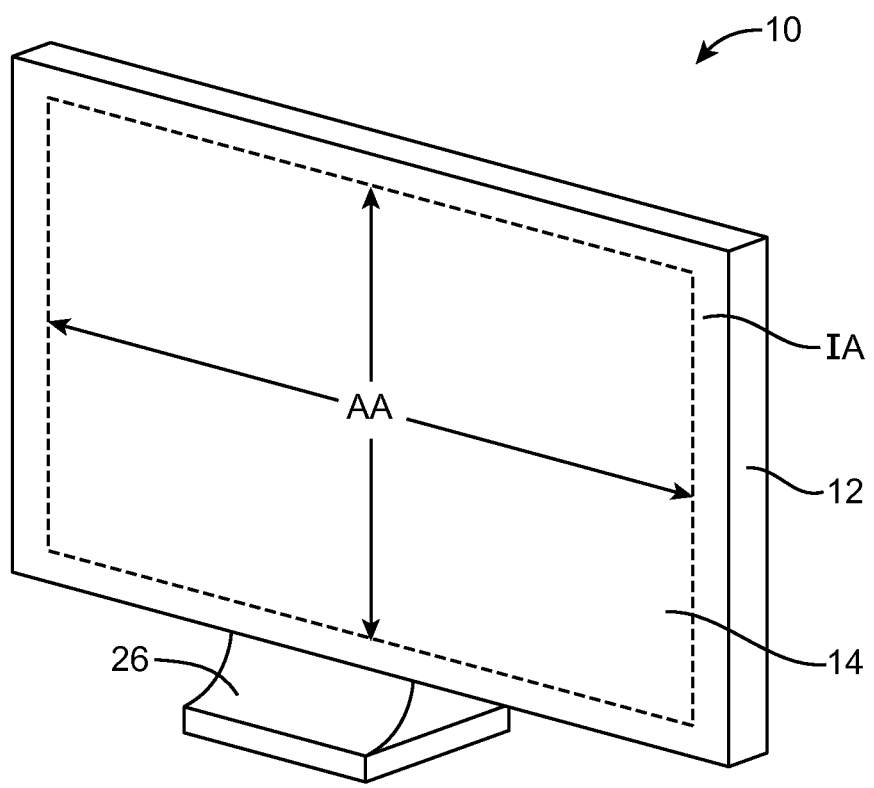
FIG. 4 is a diagram of an illustrative electronic device such as a computer monitor with a built-in computer having a display and one or more optical components in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12. Display 14 may include an inactive region such as inactive region IA that surrounds active region AA.

If desired, display 14 may be configured so as to minimize or eliminate the size of inactive region IA along one or more edges of active region AA. Configurations in which inactive region IA extends along all four edges of a rectangular active region AA are described herein as an example.

Figure 5:
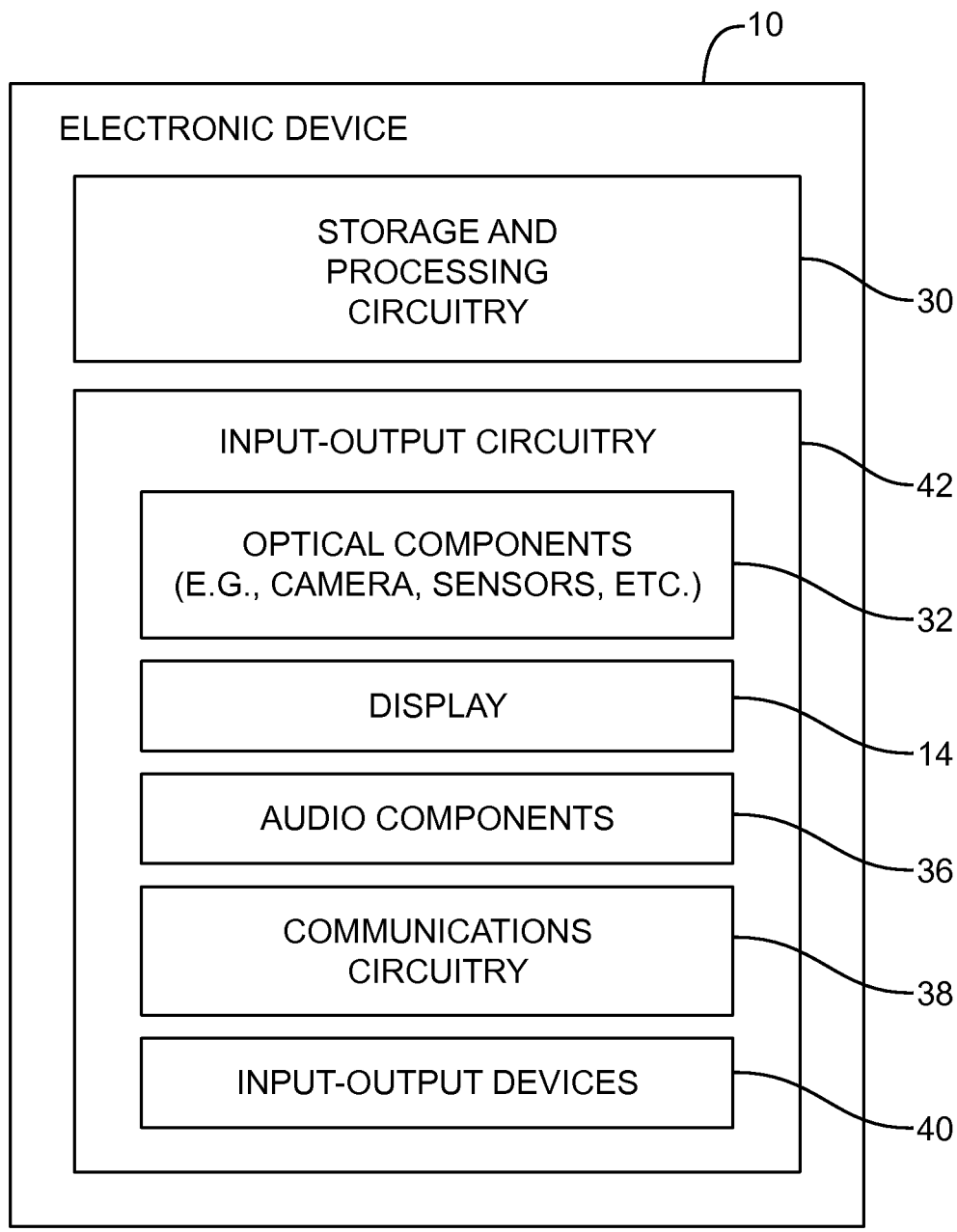
FIG. 5 is a schematic diagram of an illustrative electronic device with a display and one or more optical components in accordance with an embodiment of the present invention.

A schematic diagram of an illustrative electronic device such as electronic device 10 of FIG. 1 is shown in FIG. 5. As shown in FIG. 5, electronic device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processors, power management units, audio codec chips, application specific integrated circuits, display driver integrated circuits, etc.

Storage and processing circuitry 30 may be used to run software on device 10 such as internet browsing applications, voice-over-internet-protocol (VOIP) telephone call applications, email applications, media playback applications, operating system functions, etc. The software may be used to implement control operations such as image acquisition operations using a camera, ambient light measurements using an ambient light sensors, proximity sensor measurements using a proximity sensor, information display functions implemented using status indicators such as light-emitting-diode status indicators, touch event measurements using a touch sensor, functions associated with displaying information on multiple (e.g., layered) displays, operations associated with performing wireless communications functions, operations associated with gathering and producing audio signals, control operations associated with gathering and processing button press event data, operations associated with opening and closing optical shutters such as liquid crystal shutters formed in a display, and other functions in device 10.

Input-output circuitry 42 may be used to allow data to be supplied to device 10 and to allow data to be provided from device 10 to external devices. Input-output circuitry 42 may include optical components 32. Optical components 32 may include cameras, ambient light sensors, light-based proximity sensors, light-emitting diode status indicators, and other equipment for producing and receiving light.

Input-output circuitry 42 may also include one or more displays such as display 14. Display 14 may be a liquid crystal display, an organic light-emitting diode display, an electronic ink display, a plasma display, a display that uses other display technologies, or a display that uses any two or more of these display technologies. Display 14 may include an array of touch sensors (i.e., display 14 may be a touch screen) or may be insensitive to touch. The touch sensors in a touch sensitive arrangement for display 14 may be capacitive touch sensors formed from an array of transparent touch sensor electrodes such as indium tin oxide (ITO) electrodes or may be touch sensors formed using other touch technologies (e.g., acoustic touch, pressure-sensitive touch, resistive touch, optical touch, etc.).

Audio components 36 may be used to provide device 10 with audio input and output capabilities. Examples of audio components that may be included in device 10 include speakers, microphones, buzzers, tone generators, and other components for producing and detecting sound.

Communications circuitry 38 may be used to provide device 10 with the ability to communicate with external equipment. Communications circuitry 38 may include analog and digital input-output port circuitry and wireless circuitry based on radio-frequency signals and/or light. Wireless circuitry in communications circuitry 38 may include radio-frequency transceiver circuitry, power amplifier circuitry, low-noise amplifiers, switches, filters, and antennas. Wireless communications circuitry in circuitry 38 may, for example, include circuitry for supporting near field communications (NFC) by transmitting and receiving near-field-coupled electromagnetic signals. For example, circuitry 38 may include a near field communications antenna and a near field communications transceiver. Circuitry 38 may also include a cellular telephone transceiver and antennas, wireless local area network transceiver circuitry and antennas, etc.

Device 10 may also include a battery, power management circuitry, accelerometers, and other sensors, and other input-output devices 40. Input-output devices 40 may include buttons, joysticks, click wheels, scrolling wheels, touch pads, key pads, keyboards, etc.

A user can control the operation of device 10 by supplying commands through input-output circuitry 42 and may receive status information and other output from device 10 using the output resources of input-output circuitry 42.

Display 14 may be, for example, a liquid crystal display. Display 14 may include an array of pixels. Each pixel may be used to control the light intensity associated with a portion of the display in active area AA.

Figure 6:
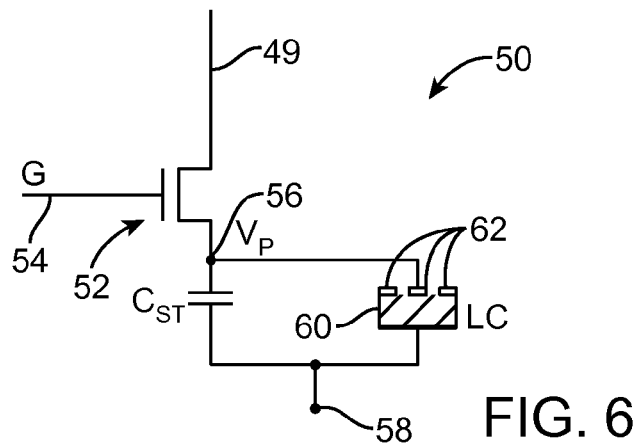
FIG. 6 is a circuit diagram of an illustrative display pixel in an array of pixels in an electronic device display in accordance with an embodiment of the present invention.

FIG. 6 is a circuit diagram of an illustrative display pixel in the pixel array of display 14. Display 14 may have a set of data lines for supplying pixel image data to columns (or rows) of display pixels in the pixel array of display 14 and may have a set of gate lines for activating and deactivating rows (or columns) of display pixels during the process of displaying images on display 14. Pixels such as pixel 50 of FIG. 6 may be located at the intersection of each gate line and data line in display 14.

A data signal D may be supplied to terminal 49 from one of the data lines in display 14. Thin-film transistor 52 (e.g., a thin-film polysilicon transistor or an amorphous silicon transistor on a thin-film transistor substrate) may have a gate terminal such as gate 54 that receives gate line signal G from display driver circuitry (e.g., gate driver circuitry). When signal G is asserted, transistor 52 will be turned on and signal D will be passed to node 56 as voltage Vp. Data for display 14 may be displayed in frames. Following assertion of signal G in one frame, signal G may be deasserted. Signal G may then be asserted to turn on transistor 52 and capture a new value of Vp in a subsequent display frame.

Pixel 40 may have a signal storage element such as capacitor Cst or other charge storage element. Storage capacitor Cst may be used to store signal Vp between frames (i.e., in the period of time between the assertion of successive signals G).

Display 14 may have a common electrode coupled to node 58. The common electrode (which is sometimes referred to as the Vcom electrode) may be used to distribute a common electrode voltage such as common electrode voltage Vcom to nodes such as node 58 in each pixel 50 of the pixel array in display 14. Capacitor Cst may be coupled between nodes 56 and 58. A parallel capacitance Clc arises across nodes 56 and 58 due to electrode structures in pixel 50 that are used in controlling the electric field through the liquid crystal material of the pixel (liquid crystal material 60). As shown in FIG. 6, electrode structures 62 may be coupled to node 56. During operation, electrode structures 62 may be used to apply a controlled electric field across a pixel-sized portion of liquid crystal material 60 in pixel 50. Due to the presence of storage capacitor Cst and the capacitance produced by electrode structures 62, the value of Vp (and therefore the associated electric field across liquid crystal material 60) may be maintained across nodes 56 and 58 for the duration of the frame. Electrode structures 62 may have any suitable shape. For example, each display pixel may have an electrode that is formed from multiple electrode fingers. The material that is used in forming electrode structures (display pixel electrode) 62 may be, for example, a transparent conductive material such as indium tin oxide.

Figure 7:
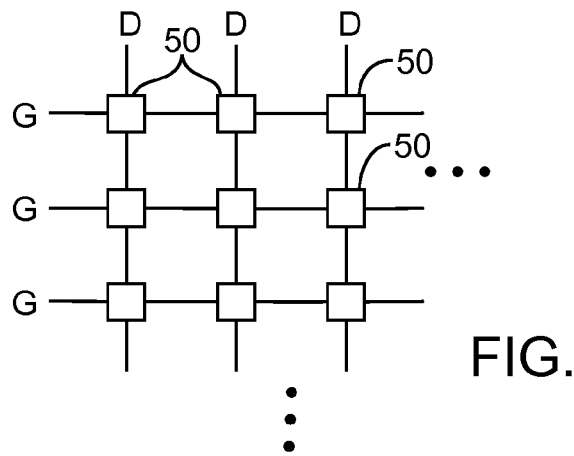
FIG. 7 is a diagram of an illustrative array of display pixels in the active area of an electronic device display in accordance with an embodiment of the present invention.

The electric field that is produced across liquid crystal material 60 causes a change in the orientations of the liquid crystals in liquid crystal material 60. This changes the polarization of light passing through liquid crystal material 60. The change in light polarization may be used in controlling the amount of light that is transmitted through each pixel 50 in active region AA of display 14. FIG. 7 is a diagram of an illustrative array of display pixels 50 in active region AA of display 14.

To provide display 14 with the ability to display color images, active area AA of display 14 may be provided with color filter elements. For example, display 14 may be provided with color filter elements such as red, green, and blue elements. Each color filter element may be used to impart color to the light associated with a respective display pixel in the pixel array of display 14 (FIG. 7).

Some or all of inactive region IA of display 14 may be provided with an opaque masking layer that blocks internal device components from view by a user of device 10. One or more openings may be formed in the opaque masking layer to allow light from internal optical components to exit device 10 and to allow external light to enter device 10 for use by internal optical components. For example, an opaque masking layer in inactive region IA may be provided with one or more holes to accommodate a camera, ambient light sensor, light-based proximity sensor, status indicator light, and/or other optical components 32.

Figure 8:
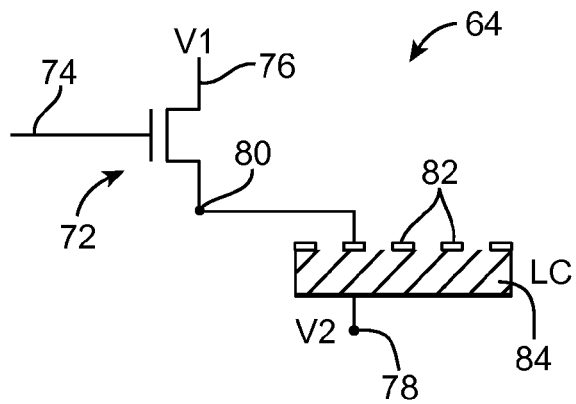
FIG. 8 is a circuit diagram of an illustrative optical component shutter formed using liquid crystal material in an inactive region of an electronic device display in accordance with an embodiment of the present invention.

To minimize the visual impact of openings in the opaque masking layer, each opening may be covered with a liquid crystal shutter structure. A circuit diagram of an illustrative liquid crystal shutter is shown in FIG. 8. As shown in FIG. 8, a first voltage V1 (e.g., a positive voltage) may be supplied to terminal 76 and a second voltage V2 (e.g., a ground voltage or a positive or negative voltage) may be supplied to terminal 78. Thin-film transistor 72 may be a thin-film polysilicon transistor or an amorphous silicon transistor and may be formed on the same thin-film transistor substrate one which thin-film transistors such as transistor 52 of FIG. 6 are formed. Transistor 72 may have a gate terminal such as gate 74 that receives a shutter control signal from control circuitry such as storage and processing circuitry 30 (FIG. 5). Using the shutter control signal, transistor 52 may be turned on and off.

When transistor 72 is turned on, voltage V1 will be applied node 80. As shown in FIG. 8, electrode structures 82 may be coupled to node 80. During operation of shutter 64, electrode structures 82 may be used to apply a controlled electric field across liquid crystal shutter material 84 in shutter 64. Electrode structures 82 may have any suitable shape. For example, electrode 82 may be formed from one or more electrode fingers. The material that is used in forming electrode 82 may be, for example, a transparent conductive material such as indium tin oxide.

The electric field that is produced across liquid crystal material 84 causes a change in the orientations of the liquid crystals in liquid crystal material 84. This changes the polarization of light passing through liquid crystal material 84. The change in light polarization may be used in controlling the amount of light that is transmitted through shutter 64 in inactive region IA of display 14.

Figure 9:
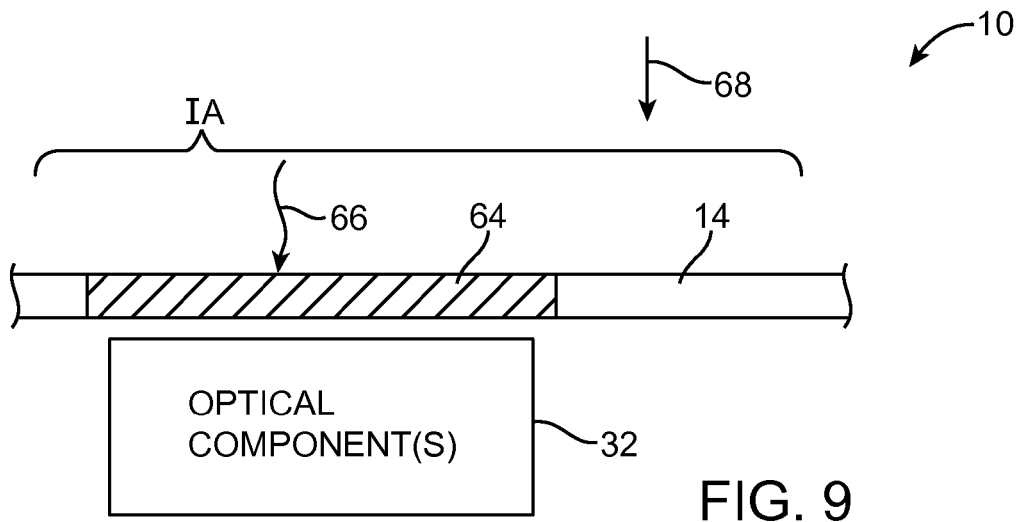
FIG. 9 is a cross-sectional side view of a portion of an electronic device in which a liquid crystal display shutter is in an opaque state and is being used to block one or more optical components from view by a user of the electronic device in accordance with an embodiment of the present invention.
Figure 10:
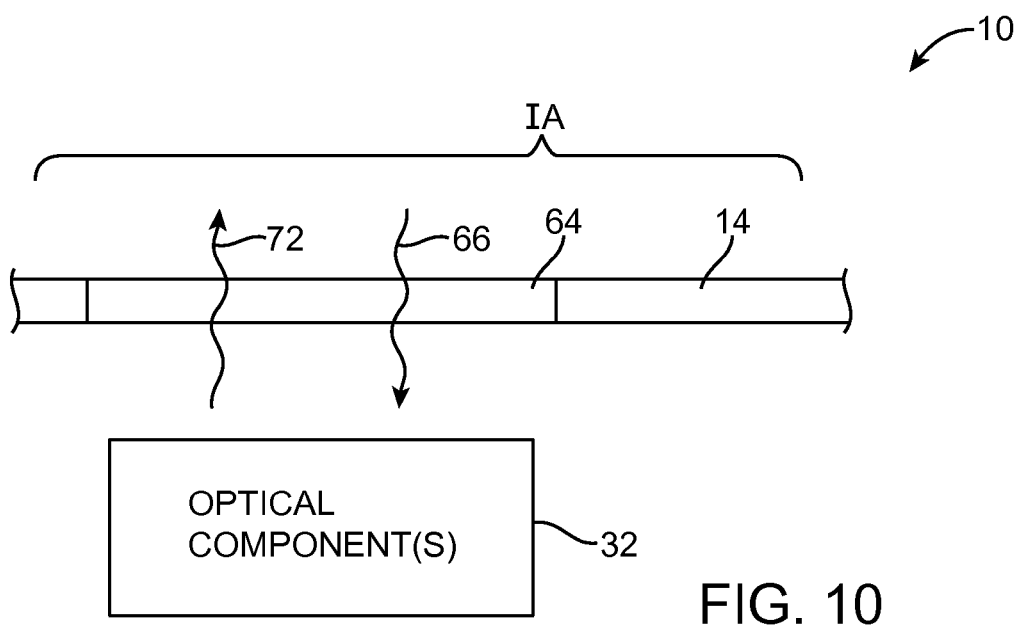
FIG. 10 is a cross-sectional side view of a portion of the electronic device of FIG. 9 in a configuration in which the liquid crystal display shutter is in a transparent state and is allowing one or more optical components to send or receive light through the shutter in accordance with an embodiment of the present invention.

Operation of a liquid crystal shutter structure for display 14 such as shutter 64 of FIG. 8 is illustrated in FIGS. 9 and 10.

FIGS. 9 and 10 are cross-sectional side views of a portion of device 10 in the vicinity of an opening in inactive area IA that has been provided with a liquid crystal shutter 64. Shutter 64 may be formed in inactive portion IA of display 14 in alignment with optical component 32. A single shutter is shown in the examples of FIGS. 9 and 10, but, in general, there may be two or more shutters and two or more associated optical components in device 10. Control circuitry in device 10 such as storage and processing circuitry 30 of FIG. 2 may be used to control the state of shutter 64 during operation of optical components 32 (e.g., to open shutter 64 to allow images to be acquired by a camera, etc.).

In FIG. 9, shutter 64 is in a closed state. In this state, shutter 64 may have an opaque (e.g., black) appearance. Shutter 64 may, for example, have a black appearance that matches surrounding black masking material in display 14. Because shutter 64 is in an opaque state, light 66 will not readily pass through shutter 64. As a result, shutter 64 will block internal device structures such as optical components 32 from view from the exterior of device 10.

In FIG. 10, shutter 64 is in an open state. In this state, shutter 64 may have a transparent (clear) appearance. Because shutter 64 is in a transparent state, light such as light 66 can pass through shutter 64 from the exterior of device 10 to the interior of device 10 and can reach internal components such as optical components 32. Light 72 that is produced by optical components 32 may also pass through shutter 64.

Optical component(s) 32 may include one or more components that produce and/or receive light.

Optical component(s) 32 may include one or more light-based proximity sensors. A light-based proximity sensor may, for example, include a light-emitting diode that that emits infrared light or light of other wavelengths. The emitted light may pass through shutter 64 when shutter 64 is in the open position of FIG. 10, as indicated by light 72. In the presence of nearby external objects, the emitted light may be reflected back through shutter 64, as indicated by light 66 in FIG. 10. The light-based proximity sensor may include a light sensor that measures the magnitude of reflected light to determine whether or not an external object is in the vicinity of the light-based proximity sensor.

Optical component(s) 32 may also include one or more light-based status indicators. A light-based status indicator may be implemented using one or more light-emitting diodes or other light sources capable of emitting light with an intensity and/or pattern that conveys information to a user. As an example, a status indicator component may be formed from one or more light-emitting diodes of one or more different colors. The status indicator light-emitting diodes may be used for indicating on/off status (power status), sleep/wake status, battery charging status, or other status information. The emitted light from the status indicator may pass through shutter 64 when shutter 64 is in its open configuration, as shown by light 72 of FIG. 10.

Optical component(s) 32 may include light detecting components such as one or more ambient light sensors. An ambient light sensor may include one or more semiconductor light detectors. The light detectors may be used to measure ambient lighting conditions for device 10. To make a light measurement, shutter 64 may be placed in its open state (FIG. 10), so that ambient light 66 may be received and measured by the detector structures associated with the ambient light sensor.

If desired, optical component(s) 32 may include one or more images sensors. For example, optical component(s) 32 may include an image sensor that has been packaged with a lens to form a camera (sometimes referred to as a camera module) or may contain other optical structures that are capable of capturing digital images for device 10. The camera may be mounted so that lens structures are pointing outwards through shutter 64. When shutter 64 is placed in its open configuration by the control circuitry of device 10, image light from an external object may be received by the camera through shutter 64, as indicated by light 66 of FIG. 10. The camera may convert the incoming image light into digital image data for use by the storage and processing circuitry of device 10.

When optical component(s) 32 are not being actively used (e.g., during moments in time in which light 72 is not being emitted and in which light 66 is not being received), shutter 64 may be placed in its closed position by the control circuitry of device 10, so that optical components 32 are hidden from view in direction 68 (FIG. 9) by a user of device 10.

Figure 11:
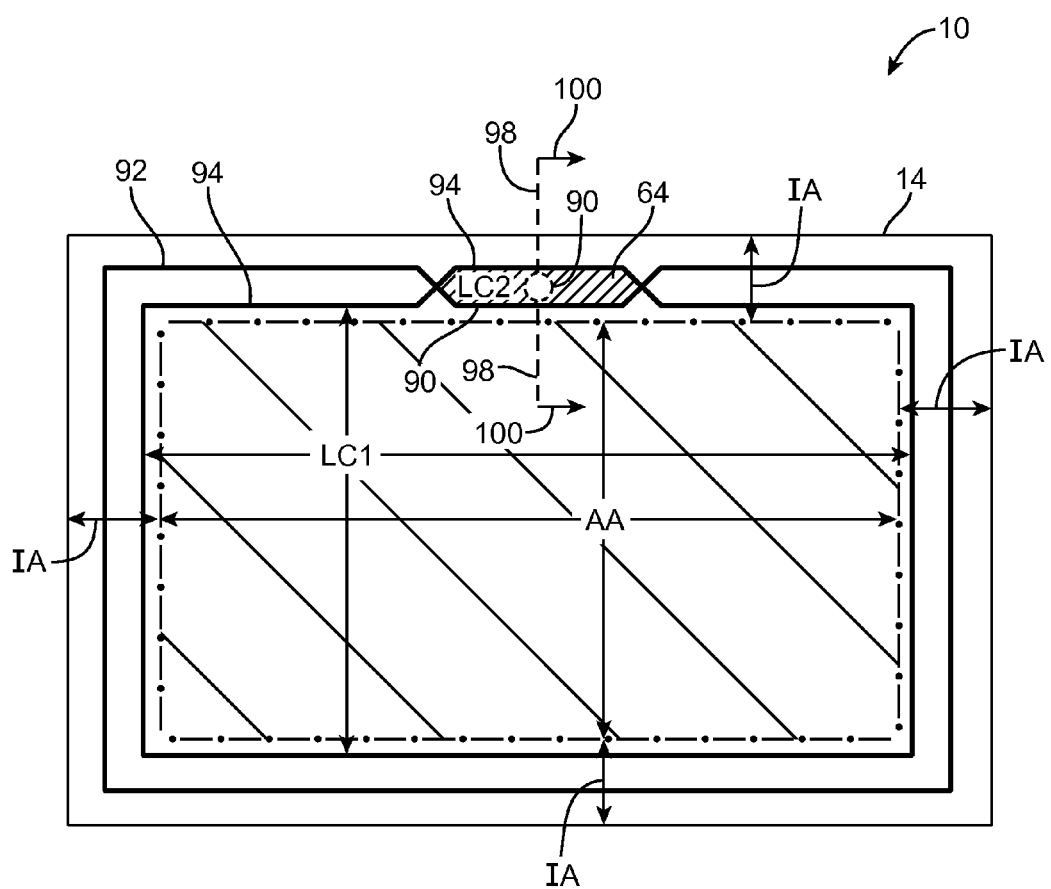
FIG. 11 is a top view of an illustrative display having an active region containing an array of display pixels that display images surrounded by an inactive region that has a liquid crystal shutter structure covering one or more optical components in accordance with an embodiment of the present invention.

FIG. 11 is a front view of display 10 showing structures that may be used in implementing an illustrative liquid crystal shutter for display 14. In the illustrative configuration of FIG. 11, active area AA of display 14 has a rectangular shape that lies in the center of the surface of display 14 and inactive area IA has a rectangular ring shape that forms a peripheral border around all of the four edges of active area AA. In active area AA, display pixels such as display pixels 50 of FIG. 6 may be arranged to form a display pixel array such as the array of pixels in FIG. 7. The array of display pixels in active area AA may be controlled by control circuitry in device 10 (e.g., a display driver integrated circuit and other control circuitry) so that display 14 can be used to display images for a user.

Inactive area IA serves as a border region surrounding the periphery of active area AA. Components such as display driver circuits, antennas, signal buses, connectors, alignment marks, and other structures may be located under inactive area IA. To hide these structures from view, inactive area IA may be covered using an opaque masking material such as a black pigmented polymer, a sheet of black plastic, or other opaque masking structures. As an example, a layer of cover glass, a color filter layer, or other display layer in display 14 may be coated with a black masking material in inactive area IA. The black masking material may be formed on the underside (inner surface) of a display cover glass or other suitable display surface (as an example). Active area AA may have a black matrix formed from thin horizontal and vertical lines of black masking material. Openings in the black matrix may be provided with color filter elements that allow colored light from the display pixel array to be emitted for viewing by a user. Active area AA may otherwise be devoid of black masking material. In inactive area AA, the black masking material may be patterned to form a black border surrounding active area AA.

Openings such as opening 90 may be formed in the black masking material within inactive area IA. Openings such as opening 90 may be used to allow light such as light 66 and 72 to pass through display 14. One or more different types of liquid crystal structure (e.g., liquid crystal layers containing different liquid crystals, different layer thicknesses, or other attributes) may be used in display 14. In the example of FIG. 11, two different types of liquid crystal structure are being used in display 14: liquid crystal material LC1 and liquid crystal material LC2.

Lines of sealant 92 and 94 may be used to seal liquid crystal material within desired regions of display 14. As shown in FIG. 11, for example, liquid crystal material LC1 (i.e., liquid crystal material 60 of FIG. 6) may be used in the display pixels in active area AA (e.g., display pixels such as display pixels 50 of FIGS. 6 and 7) and may be contained within active area AA by sealant 94 (and a portion of sealant 92). Liquid crystal material LC2 (i.e., liquid crystal material 84 of shutter 64 of FIG. 8) may be confined within an area that overlaps opening 90 in inactive region IA. As shown in FIG. 11, the outline of the region in which liquid crystal material LC1 is confined may be surrounded by adjacent portions of sealant lines 92 and 94. Sealant lines 92 and 94 may be formed from any suitable material such as epoxy or other adhesives.

Figure 12:
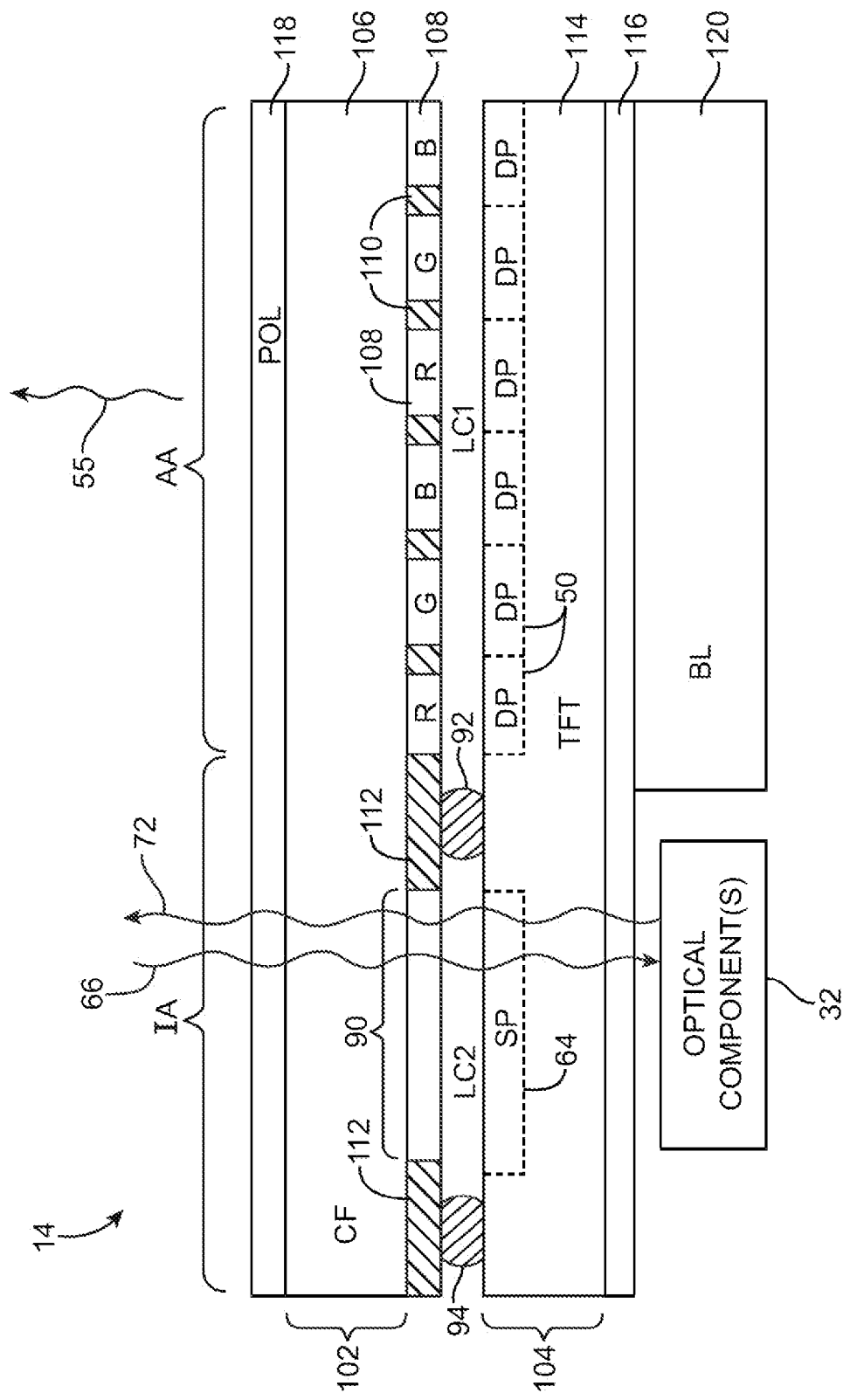
FIG. 12 is a cross-sectional side view of a portion of the display in FIG. 11 in the vicinity of the liquid crystal shutter in accordance with an embodiment of the present invention.

FIG. 12 is a cross-sectional side view of display 14 of FIG. 11 taken along line 98 in FIG. 11 and viewed in direction 100. As shown in FIG. 12, sealant 92 and 94 may be interposed between display layers such as color filter layer 102 and thin-film transistor layer 104.

Color filter layer 102 may include color filter elements 108 formed on a substrate layer such as color filter substrate layer 106. Color filter substrate layer 106 may be formed from clear plastic, clear glass, or other transparent material. Color filter elements 108 may be formed in an array (e.g., an array of alternating red, green, and blue color filter elements) and may therefore sometimes be referred to as a color filter array or color filter array structures. The illustrative color filter array of FIG. 12 has red (R), green (G), and blue (B) elements aligned with respective display pixels 50 in thin-film transistor layer 104. Black matrix material 110 in active area AA may be interposed between adjacent color filter elements 108.

In inactive area IA, black masking material 112 may form a black border for display 14. Opening 90 may be formed from a circular hole, a rectangular hole, or an opening of other suitable shapes in black masking material 112. Liquid crystal material LC2 for shutter 64 may be interposed between respective sealant borders 94 and 92 and may overlap liquid crystal shutter structures 64 on thin-film transistor layer substrate 114 in thin-film transistor layer 104. Substrate 114 may be formed form a clear plastic layer, a clear glass layer, or other transparent substrate material. When shutter 64 is in its open configuration, light 66 may be received by one or more optical components 32 through opening 90 in black masking layer 112 and shutter 64 and light produced by one or more optical components 32 may pass through shutter 64 and opening 90.

In active region AA, backlight 55 for display 14 may be provided by backlight unit 120. Backlight unit 120 may include a transparent light guide plate. A light source such as an array of light-emitting diodes may emit light into one or more edges of the light guide plate. The light guide plate may distribute light over the rear surface of display 14 in active area AA. A reflector on the lower surface of the light guide plate may help reflect light that has leaked downwards back in an upwards direction to serve as backlight 55.

Display 14 may include upper polarizer 118 and lower polarizer 116. During operation, control circuitry may control the array of display pixels 50 to adjust the electric fields that are produced by display pixels 50 in liquid crystal layer LC1. These electric field adjustments may rotate different pixels of liquid crystal material LC1 by different amounts, thereby rotating the polarization of backlight 55 that is traveling through liquid crystal material LC1 by different amounts. In combination with upper and lower polarizers 116 and 118, adjustment of the polarization of backlight 55 that is traveling through liquid crystal layer LC1 liquid crystal will create images for viewing by a user of device 10.

When shutter 64 is in its open position, one or more optical components 32 may emit and receive light through shutter 64. To ensure that excess light is not absorbed by liquid crystal material 64, it may be desirable to configure liquid crystal material LC2 to ensure satisfactory light transmission. As an example, liquid crystal material LC2 may be provided with a thinner thickness and/or may be formed from a liquid crystal material that exhibits a higher maximum transmission than liquid crystal material LC1.

When shutter 64 is in its closed position, the electrode in shutter 64 may apply an electric field to liquid crystal material LC2 that orients liquid crystal material LC2 so that (in combination with upper polarizer 118 and lower polarizer 116), liquid crystal material LC2 blocks light transmission. In this situation, liquid crystal shutter 64 may have a black appearance that matches the black color of surrounding portions of black masking layer 112, thereby ensuring that display 14 has an uncluttered and aesthetically appealing appearance in inactive region IA.

If desired, display 14 of FIG. 12 may be provided with additional display layers. For example, display 14 may be provided with a cover layer such as a layer of cover glass. The cover glass may have a black peripheral border portion that is aligned with inactive area IA. Display 14 may also have anti-smudge layers, antireflection coating layers, anti-scratch layers, layers that perform two or more of these functions or other suitable functions, etc. The display layers of display 14 of FIG. 12 are shown as an example. Other display configurations may be provided with controllable shutter structures such as liquid crystal shutter 64, if desired.

The foregoing is merely illustrative of the principles of this invention and various modifications can be made by those skilled in the art without departing from the scope and spirit of the invention.

What is claimed is:
1. An electronic device, comprising:
   a display having an array of display pixels arranged to form an active area for the display in which images are displayed;
   a liquid crystal shutter in an inactive area of the display;
   an optical component aligned with the liquid crystal shutter, wherein the display comprises a first liquid crystal material in the array of display pixels and a second liquid crystal material in the liquid crystal shutter;
   a color filter layer; and
   a thin-film transistor layer, wherein the first liquid crystal material is interposed between the color filter layer and the thin-film transistor layer in the active area and wherein the second liquid crystal material is interposed between the color filter layer and the thin-film transistor layer in the inactive area.

2. The electronic device defined in claim 1 wherein the first and second liquid crystal materials are different materials.

3. The electronic device defined in claim 1 further comprising at line of sealant that separates the first liquid crystal material from the second liquid crystal material.

4. The electronic device defined in claim 1 further comprising a layer of opaque masking material in the inactive area.

5. The electronic device defined in claim 4 wherein the layer of opaque masking material has an opening that is aligned with the liquid crystal shutter and the optical component.

6. The electronic device defined in claim 5 wherein the optical component comprises at least one optical component selected from the group consisting of: a light-based proximity sensor, an ambient light sensor, a status indicator light, and a camera.

7. The electronic device defined in claim 5 wherein the optical component comprises a camera and wherein the liquid crystal shutter is configured to operate in:
- a closed state in which the camera is blocked from view through the opening; and
- an open state in which image light for the camera passes through the opening and the second liquid crystal material of the liquid crystal shutter.

8. The electronic device defined in claim 7 further comprising control circuitry that is configured to place the liquid crystal shutter in the open state to acquire images with the camera.

9. The electronic device defined in claim 1 further comprising control circuitry that controls operation of the liquid crystal shutter, wherein the liquid crystal shutter is configured to operate in:
- a closed state in which the optical component is blocked from view through the display; and
- an open state in which light associated with the optical component passes through the display and the second liquid crystal material of the liquid crystal shutter.

10. An electronic device, comprising:
- a display having an array of display pixels arranged to form an active area for the display in which images are displayed;
- a liquid crystal shutter in an inactive area of the display; and
- an optical component aligned with the liquid crystal shutter, wherein the display comprises a color filter layer and a thin-film transistor layer and wherein the liquid crystal shutter is formed from liquid crystal material that lies between the color filter layer and the thin-film transistor layer in a portion of the inactive area.

11. The electronic device defined in claim 10 wherein the liquid crystal shutter comprises an electrode and a thin-film transistor.

* * * * *